United States Patent
Kakishima et al.

(10) Patent No.: US 12,395,995 B2
(45) Date of Patent: Aug. 19, 2025

(54) USER TERMINAL AND RADIO COMMUNICATION METHOD

(71) Applicant: NTT DOCOMO, INC., Tokyo (JP)

(72) Inventors: Yuichi Kakishima, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 479 days.

(21) Appl. No.: 17/255,693

(22) PCT Filed: Jun. 28, 2018

(86) PCT No.: PCT/JP2018/024738
§ 371 (c)(1),
(2) Date: Dec. 23, 2020

(87) PCT Pub. No.: WO2020/003475
PCT Pub. Date: Jan. 2, 2020

(65) Prior Publication Data
US 2021/0289535 A1  Sep. 16, 2021

(51) Int. Cl.
*H04W 72/23* (2023.01)
*H04W 72/54* (2023.01)

(52) U.S. Cl.
CPC .......... *H04W 72/23* (2023.01); *H04W 72/54* (2023.01)

(58) Field of Classification Search
None
See application file for complete search history.

(56) References Cited

U.S. PATENT DOCUMENTS 9,392,505 B2 * 7/2016 Kim ................. H04W 36/0058
10,631,352 B2 * 4/2020 Kazmi ................. H04W 76/15
(Continued)

FOREIGN PATENT DOCUMENTS

JP    2012244477 A    12/2012
WO   2009019892 A1    2/2009
(Continued)

OTHER PUBLICATIONS

3GPP TS 36.300 V13.4.0 "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 13)" Jun. 2016 (310 pages).
(Continued)

*Primary Examiner* — Phirin Sam
(74) *Attorney, Agent, or Firm* — Osha Bergman Watanabe & Burton LLP

(57) ABSTRACT

A user terminal (20) includes a reception section that receives a first radio signal transmitted by a first transmission point using a first radio resource and a second radio signal transmitted by a second transmission point using a second radio resource, and a control section that controls reception processing of the first radio signal transmitted by the first transmission point using the first radio resource and the second radio signal transmitted by the second transmission point using the second radio resource on assumption that the first radio resource and the second radio resource are permitted to be configured to at least one of different times and different frequency bands.

5 Claims, 10 Drawing Sheets

(56) References Cited

U.S. PATENT DOCUMENTS

| | | | | |
|---|---|---|---|---|
| 10,652,001 | B2* | 5/2020 | Seo | H04W 72/27 |
| 10,750,533 | B2* | 8/2020 | Lee | H04W 72/23 |
| 11,451,436 | B2* | 9/2022 | Yi | H04L 5/0044 |
| 11,621,873 | B2* | 4/2023 | Abedini | H04W 8/245 |
| | | | | 370/329 |
| 2011/0222525 | A1 | 9/2011 | Kishigami et al. | |
| 2013/0114565 | A1* | 5/2013 | Chen | H04L 5/0053 |
| | | | | 370/330 |
| 2014/0044053 | A1 | 2/2014 | Kimura | |
| 2016/0323078 | A1 | 11/2016 | Takeda et al. | |
| 2016/0337108 | A1* | 11/2016 | Choi | H04L 5/0055 |
| 2017/0079065 | A1* | 3/2017 | Lyu | H04W 72/23 |
| 2017/0141903 | A1* | 5/2017 | Xu | H04L 1/0005 |
| 2017/0208494 | A1* | 7/2017 | Moon | H04B 7/0695 |
| 2017/0265154 | A1* | 9/2017 | Seo | H04W 72/51 |
| 2017/0280425 | A1* | 9/2017 | Yang | H04L 5/0053 |
| 2017/0285130 | A1* | 10/2017 | Kim | H04L 1/1812 |
| 2017/0359836 | A1* | 12/2017 | Kato | H04B 17/318 |
| 2018/0077748 | A1* | 3/2018 | Kazmi | H04W 76/14 |
| 2018/0152924 | A1* | 5/2018 | Ouchi | H04W 48/10 |
| 2018/0205523 | A1* | 7/2018 | Imamura | H04W 72/20 |
| 2018/0235012 | A1* | 8/2018 | Chen | H04W 72/21 |
| 2019/0037584 | A1* | 1/2019 | Park | H04W 72/1268 |
| 2019/0052406 | A1* | 2/2019 | Yang | H04L 1/1819 |
| 2019/0069271 | A1* | 2/2019 | Reial | H04W 68/02 |
| 2019/0116562 | A1* | 4/2019 | Takeda | H04W 72/04 |
| 2019/0149365 | A1* | 5/2019 | Chatterjee | H04L 25/0226 |
| | | | | 370/329 |
| 2019/0199496 | A1* | 6/2019 | Qin | H04B 7/0617 |
| 2019/0261327 | A1* | 8/2019 | Hosseini | H04L 5/0051 |
| 2019/0312713 | A1* | 10/2019 | Yang | H04W 72/23 |
| 2019/0342907 | A1* | 11/2019 | Huang | H04W 72/23 |
| 2019/0357198 | A1* | 11/2019 | Xiong | H04W 72/51 |
| 2019/0394758 | A1* | 12/2019 | Cheng | H04L 1/203 |
| 2020/0008231 | A1* | 1/2020 | Vilaipornsawai | H04W 72/21 |
| 2020/0028642 | A1* | 1/2020 | He | H04L 5/0048 |
| 2020/0068599 | A1* | 2/2020 | Yang | H04L 5/0055 |
| 2020/0077432 | A1* | 3/2020 | Xiong | H04L 27/26025 |
| 2020/0092869 | A1* | 3/2020 | Hwang | H04L 5/0096 |
| 2020/0274646 | A1* | 8/2020 | Du | H04L 1/1812 |
| 2021/0037509 | A1* | 2/2021 | Lin | H04L 5/0051 |
| 2021/0045144 | A1* | 2/2021 | Kim | H04L 5/0055 |
| 2021/0058956 | A1* | 2/2021 | Chatterjee | H04L 1/1812 |
| 2021/0092757 | A1* | 3/2021 | Park | H04W 72/21 |
| 2021/0226760 | A1* | 7/2021 | Ye | H04L 5/0073 |
| 2021/0266953 | A1* | 8/2021 | Pelletier | H04W 72/1289 |
| 2021/0391964 | A1* | 12/2021 | Kwak | H04B 7/0456 |
| 2022/0116151 | A1* | 4/2022 | Wang | H04L 1/1812 |

FOREIGN PATENT DOCUMENTS

| | | |
|---|---|---|
| WO | 2015050099 A1 | 4/2015 |
| WO | 2015098529 A1 | 7/2015 |
| WO | 2018030098 A1 | 2/2018 |

OTHER PUBLICATIONS

3GPP TR 36.741 V14.0.0 "3rd Generation Partnership Project; Technical Specification Group Radio Access Network; Study on further enhancements to Coordinated Multi Point (COMP) Operation for LTE (Release 14)" Mar. 2017 (25 pages).

International Search Report issued in International Application No. PCT/JP2018/024738, mailed Sep. 18, 2018 (5 pages).

Extended European Search Report issued in counterpart European Patent Application No. 18924037.7, mailed on Jan. 21, 2022 (8 pages).

Office Action issued in the counterpart Canadian Patent Application No. 3,104,606, mailed on Jan. 25, 2022 (4 pages).

Office Action issued in the counterpart Japanese Patent Application No. 2020-526836, mailed on Feb. 15, 2022 (8 pages).

ZTE Corporation, ZTE Microelectronics; "Potential enhancements for non-coherent JT"; 3GPP TSG RAN WG1 Meeting #86, R1-166333; Gothenburg, Sweden, Aug. 22-26, 2016 (5 pages).

CATT; "Considerations on DL multi-panel and multi-TRP transmission"; 3GPP TSG RAN WG1 Meeting NR#3, R1-1715798; Nagoya, Japan, Sep. 18-21, 2017 (4 pages).

Huawei, HiSilicon; "CSI acquisition details for NCJT"; 3GPP TSG RAN WG1 Meeting #91, R1-1719815; Reno, USA, Nov. 17-Dec. 1, 2017 (7 pages).

Office Action issued in Canadian Application No. 3,104,606; Dated Dec. 2, 2022 (3 pages).

Office Action issued in the counterpart Japanese Patent Application No. 2020-526836, mailed on Aug. 9, 2022 (7 pages).

Office Action issued in the counterpart Chinese Patent Application No. 201880095149.9, mailed on Jun. 29, 2023 (12 pages).

Office Action issued in Canadian Application No. 3, 104,606, mailed Aug. 7, 2024 (4 pages).

Office Action issued in the counterpart Canadian Application No. 3,104,606, mailed Oct. 3, 2023 (4 pages).

* cited by examiner

USER TERMINAL AND RADIO COMMUNICATION METHOD

TECHNICAL FIELD

The present disclosure relates to a user terminal and a radio communication method.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio (NR), and the like.

In addition, a Coordinated Multi-Point transmission/reception (COMP) technique in which a plurality of transmitting points (for example, radio base stations) in coordination transmit and receive signals for one user terminal has been studied for the LTE-A, for example. In Non Coherent-Joint Transmission (NC-JT) that is one of the CoMP techniques, the plurality of transmitting points can transmit different data streams with use of resources that are the same in the time direction and the frequency direction, and hence the data rate can be increased.

CITATION LIST

Non-Patent Literature

NPL 1

3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

For the future radio communication system to which the NC-JT is applied, the flexibility with respect to resource allocation is desired to be enhanced.

An object of this disclosure is to enhance the flexibility of resource allocation.

Solution to Problem

A user terminal according to one aspect of the present disclosure includes: a reception section that receives a first radio signal transmitted by a first transmission point, using a first radio resource, and a second radio signal transmitted by a second transmission point, using a second radio resource; and a control section that controls reception processing of the first radio signal and the second radio signal on assumption that the first radio resource and the second radio resource are permitted to be configured to at least one of different times and different frequency bands.

A radio communication method according to one aspect of the present disclosure includes: receiving a first radio signal transmitted by a first transmission point, using a first radio resource and a second radio signal transmitted by a second transmission point, using a second radio resource; and controlling reception processing of the first radio signal and the second radio signal on assumption that the first radio resource and the second radio resource are permitted to be configured to at least one of different times and different frequency bands.

Advantageous Effects of Invention

According to one aspect of this disclosure, the flexibility of the resource allocation can be enhanced.

DESCRIPTION OF EMBODIMENTS

Hereinafter, an embodiment of this disclosure will be described in detail with reference to the accompanying drawings.

EMBODIMENT

Figure 1:
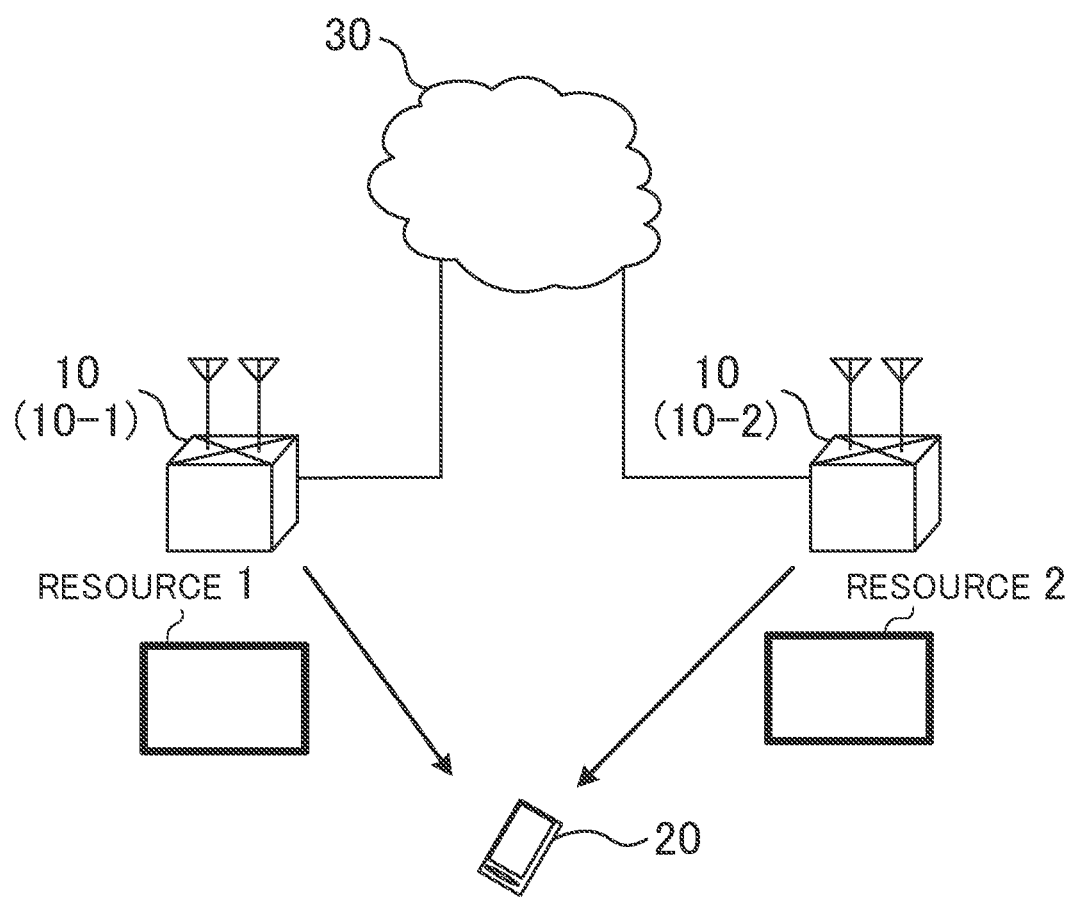
FIG. 1 illustrates an example of a radio communication system according to an embodiment of this disclosure.

FIG. 1 illustrates an example of a radio communication system according to this embodiment.

FIG. 1 illustrates two radio base stations 10 (radio base station 10-1 and radio base station 10-2), one user terminal 20, and network (may be hereinafter referred to as NW) 30 to which radio base stations 10 are connected.

Note that, radio base station 10 may be referred to as an eNodeB (eNB), a gNodeB (gNB), a transmission point, a transmitting point, a Transmission Reception Point (TRP), or a cell. In addition, user terminal 20 may be referred to as a User Equipment (UE). In addition, NW 30 may be referred to as a core network or an X2 interface. A higher station apparatus (not shown) that controls a plurality of radio base stations may be connected to NW 30. In addition, processing of NW 30 in the following description may be understood as processing of radio base stations 10 (for example, gNBs), for example.

In the radio communication system illustrated in FIG. 1, the Non Coherent-Joint Transmission (NC-JT) in a downlink Coordinated Multi-Point transmission and/or reception (COMP) technique is applied.

In the downlink NC-JT, each of radio base station 10-1 and radio base station 10-2 transmits a downlink radio signal (may be hereinafter referred to as a downlink signal) to user terminal 20. For example, in FIG. 1, radio base station 10-1 transmits a downlink signal using resource 1, and radio base station 10-2 transmits a downlink signal using resource 2.

Resource 1 and resource 2 are resources that are specified in terms of the time direction and the frequency direction. In the NC-JT, scheduling for user terminal 20 including the allocation of resource 1 and resource 2 to user terminal 20 is executed in coordination.

For example, each of radio base station 10-1 and radio base station 10-2 executes scheduling for transmitting a downlink signal to user terminal 20. Then, for example, radio base station 10-1 performs coordination between the radio base stations by transmitting information indicating the result of the scheduling (scheduling information) and/or timing information to radio base station 10-2 via NW 30.

Alternatively, radio base station 10-1 may perform the scheduling for transmitting a downlink signal to user terminal 20 from radio base station 10-1, and the scheduling for transmitting a downlink signal to user terminal 20 from radio base station 10-2. In this case, radio base station 10-2 transmits a downlink signal to user terminal 20 based on the scheduling information acquired from radio base station 10-1.

Alternatively, NW 30 (for example, a higher station apparatus) may perform the scheduling for transmitting a downlink signal to user terminal 20 from radio base station 10-1, and the scheduling for transmitting a downlink signal to user terminal 20 from radio base station 10-2. In this case, each of radio base station 10-1 and radio base station 10-2 transmits a downlink signal to user terminal 20 based on the scheduling information acquired from NW 30.

Note that, an example of the resource allocation to user terminal 20 is described below.

Next, an exemplary configuration of radio base station 10 and user terminal 20 is described.

<Radio Base Station>

Figure 2:
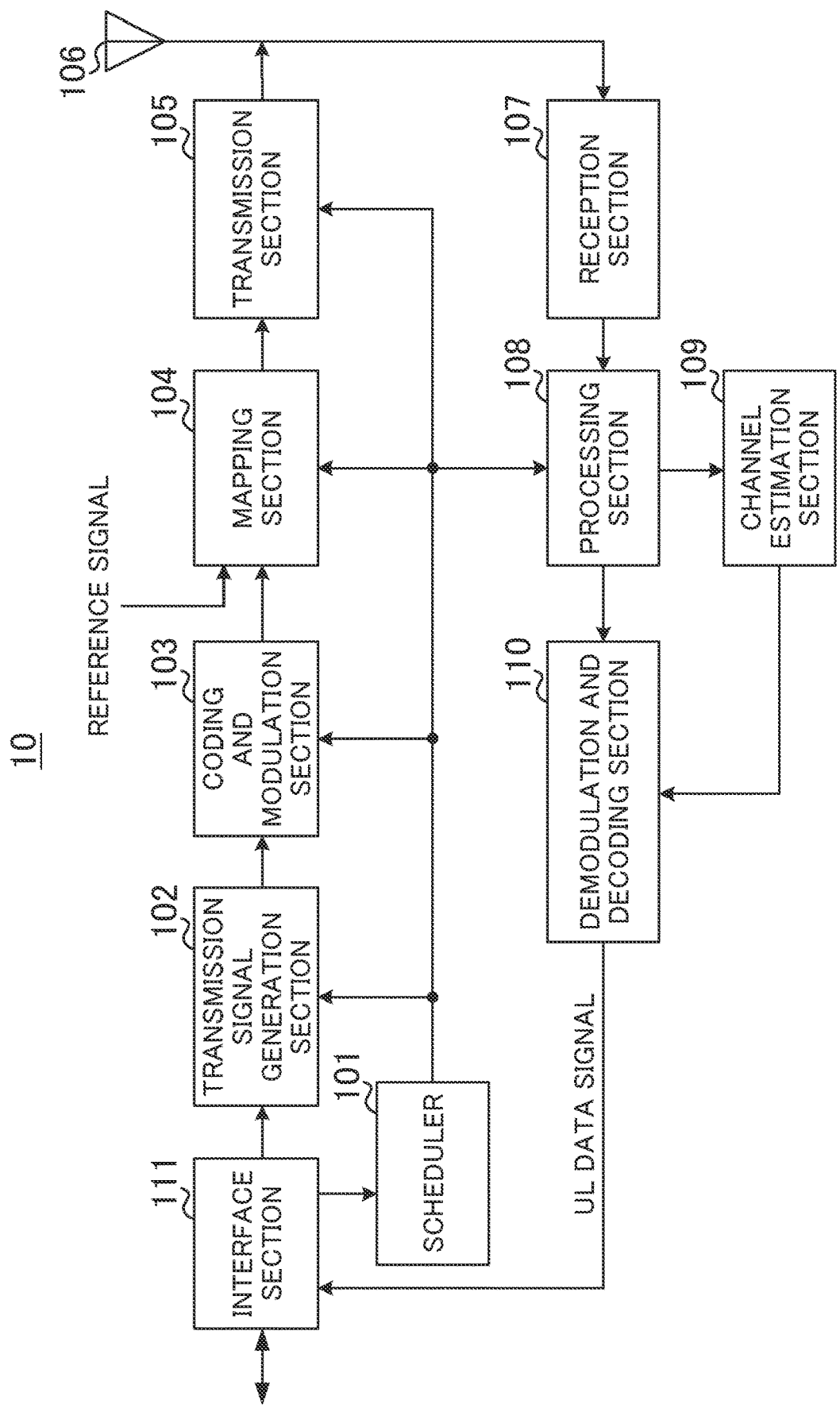
FIG. 2 is a block diagram illustrating an example of the entire configuration of a radio base station according to an embodiment of this disclosure.

FIG. 2 is a block diagram illustrating an example of the entire configuration of radio base station 10 according to this embodiment. Radio base station 10 includes scheduler 101, transmission signal generation section 102, coding and modulation section 103, mapping section 104, and transmission section 105. In addition, radio base station 10 includes antenna 106, reception section 107, processing section 108, channel estimation section 109, demodulation and decoding section 110, and interface section 111.

Radio base station 10 transmits a downlink (DL) control signal to user terminal 20 using a downlink control channel (for example, a Physical Downlink Control Channel (PDCCH)). Radio base station 10 transmits a DL data signal and a reference signal to user terminal 20 using a downlink data channel (for example, a Physical Downlink Shared Channel (PDSCH)). The downlink control channel and/or the downlink data channel is provided in a radio resource used in the transmission of the downlink signal by radio base station 10.

Scheduler 101 performs scheduling (for example, resource allocation) of the downlink (DL) signals (for example, the DL data signal, a DL control signal, the reference signal, and the like). In addition, scheduler 101 performs scheduling (for example, resource allocation) of uplink (UL) signals (for example, an UL data signal, an UL control signal, the reference signal, and the like). A Demodulation Reference Signal (DMRS) and/or a Channel State Information-Reference Signal (CSI-RS) may be included in the scheduled reference signal. The DMRS is a signal for demodulating the DL data signal, and the CSI-RS is a signal for estimating the channel quality.

In the scheduling, scheduler 101 configures the resource allocated to user terminal 20. Note that scheduler 101 may configure the resource based on a resource allocation method output from interface section 111, for example. In this case, the resource allocation method may be specified by NW 30 (refer to FIG. 1). Alternatively, NW 30 may configure the resource allocated to user terminal 20, and scheduler 101 may acquire information on the configured resource from interface section 111.

Further, scheduler 101 configures a mapping position of the signal transmitted to user terminal 20 in the resource allocated to user terminal 20.

In addition, scheduler 101 outputs the scheduling information to transmission signal generation section 102 and mapping section 104.

In addition, scheduler 101 configures the transmission method of the DL data signal and the UL data signal based on the channel quality (for example, Channel State Information (CSI)) between radio base station 10 and user terminal 20, for example. The channel quality between radio base station 10 and user terminal 20 is determined by user terminal 20 and is reported from user terminal 20, for example.

The configured transmission method may include at least one of a Modulation and Coding Scheme (MCS) (a code rate, modulation scheme and the like), an application method of a Codeword (CW), a transmission rank, a precoder, and transmission power, for example. Information indicating the configured transmission method may be included in the scheduling information.

For example, scheduler 101 configures the MCS, and scheduler 101 outputs information on the configured MCS to transmission signal generation section 102 and coding and modulation section 103. Note that the MCS is not limited to a case where the MCS is configured by radio base stations 10, and may be configured by user terminal 20. When user terminal 20 configures the MCS, radio base station 10 receives the MCS information from user terminal 20 (not illustrated).

Transmission signal generation section 102 generates a transmission signal (including the DL data signal and/or the DL control signal). For example, the DL data signal includes the data transmitted to user terminal 20 that is output from interface section 111. In addition, for example, the DL control signal includes the scheduling information output from scheduler 101. The DL control signal may include Downlink Control Information (DCI) indicating the scheduling information. Transmission signal generation section 102 outputs the generated transmission signal to coding and modulation section 103.

Coding and modulation section 103 performs coding processing and modulation processing on the transmission signal input from transmission signal generation section 102 based on the scheduling information (for example, the MCS information) input from scheduler 101, for example. Coding and modulation section 103 outputs the transmission signal after the modulation to mapping section 104.

Mapping section 104 maps the transmission signal input from coding and modulation section 103 to a predetermined radio resource (DL resource) based on the scheduling information (for example, DL resource allocation) input from scheduler 101. Mapping section 104 outputs the DL signal mapped to the radio resource to transmission section 105.

Note that mapping section 104 may perform processing according to the CB mapping and/or precoding processing on the transmission signal based on the scheduling information (for example, the information on the application method of the CW, the transmission rank, and the precoder). At least one of the processing may be executed by coding and modulation section 103.

Transmission section 105 performs transmission processing such as up-conversion and amplification on the DL signal input from mapping section 104 based on the scheduling information (for example, the transmission power) input from scheduler 101, and transmits a radio frequency signal (DL signal) from antenna 106.

Reception section 107 performs reception processing such as amplification and down-conversion on an uplink radio signal (UL signal) received by antenna 106, and outputs the UL signal to processing section 108.

Processing section 108 separates (demaps) the UL data signal and the DMRS from the UL signal input from reception section 107 based on the scheduling information (for example, the UL resource allocation) input from scheduler 101. Then, processing section 108 outputs the UL data signal to demodulation and decoding section 110 and outputs the DMRS to channel estimation section 109.

Channel estimation section 109 performs channel estimation using the DMRS of the UL signal, and outputs a channel estimation value that is the estimation result to demodulation and decoding section 110.

Demodulation and decoding section 110 performs demodulation and decoding processing on the UL data signal input from processing section 108 based on the channel estimation value input from channel estimation section 109. Demodulation and decoding section 110 transfers the UL data signal after the demodulation to interface section 111.

Note that interface section 111 performs processing relating to a layer higher than a physical layer or a MAC layer and the like. In addition, interface section 111 may transfer the UL data signal after the demodulation to NW 30.

<User Terminal>

Figure 3:
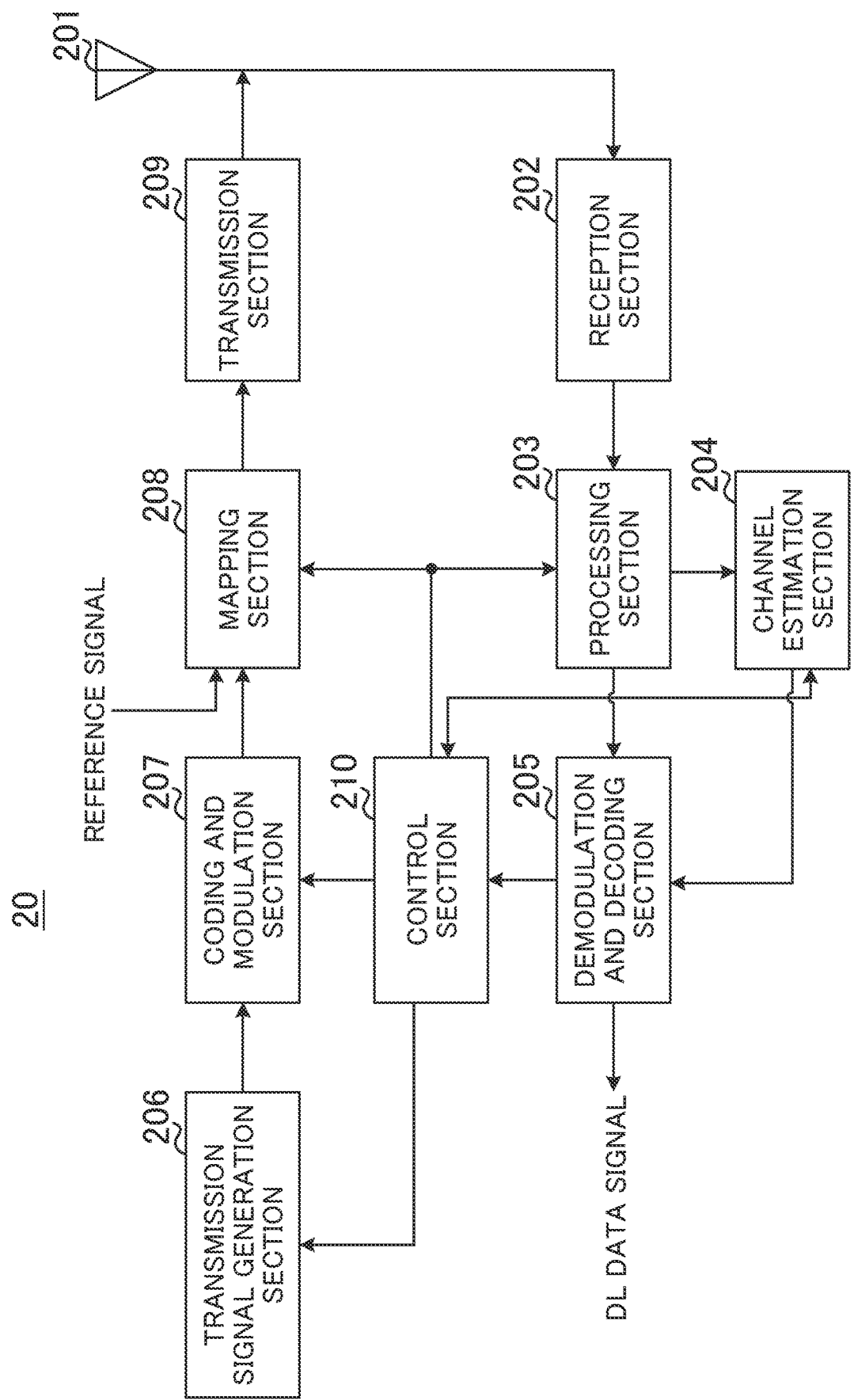
FIG. 3 is a block diagram illustrating an example of the entire configuration of a user terminal according to an embodiment of this disclosure.

FIG. 3 is a block diagram illustrating an example of the entire configuration of user terminal 20 according to this embodiment. User terminal 20 includes antenna 201, reception section 202, processing section 203, channel estimation section 204, demodulation and decoding section 205, transmission signal generation section 206, coding and modulation section 207, mapping section 208, transmission section 209, and control section 210.

In addition, user terminal 20 transmits an uplink (UL) control signal to radio base stations 10 using an uplink control channel (for example, a Physical Uplink Control Channel (PUCCH)) or an uplink data channel (for example, a Physical Uplink Shared Channel (PUSCH)). User terminal 20 transmits the UL data signal and the DMRS to radio base stations 10 using the uplink data channel (for example, the Physical Uplink Shared Channel (PUSCH)).

Reception section 202 performs reception processing such as amplification and downconversion on the radio frequency signal (DL signal) received by antenna 201, and outputs the DL signal to control section 203. The DL signal at least includes the DL data signal and the reference signal (the DMRS and/or the CSI-RS).

Processing section 203 separates (demaps) the DL data signal and the reference signal from the DL signal input from reception section 202. Then, control section 203 outputs the DL signal to demodulation and decoding section 205, and outputs the DMRS to channel estimation section 204.

In addition, processing section 203 separates (demaps) the DL data signal from the DL signal based on the scheduling information (for example, the DL resource allocation) input from control section 210, and outputs the DL data signal to demodulation and decoding section 205.

Note that, when the NC-JT is applied and user terminal 20 receives the DL signal from the plurality of radio base stations 10, processing section 203 performs reception processing corresponding to the NC-JT on the DL signal based on the instruction of control section 210. For example, processing section 203 may separate the reference signal and the DL data signal from the DL signal transmitted by the plurality of radio base stations 10 using Minimum Mean Square Error (MMSE) equalization. Note that the DL signal received from the plurality of radio base stations 10 does not necessarily need to include the DL control signal.

In addition, processing section 203 may perform reception processing (for example, post-coding processing) corresponding to the transmission processing of the DL signal based on the instruction of control section 210.

Channel estimation section 204 performs channel estimation using the separated DMRS, and outputs the channel estimation value that is the estimation result to demodulation and decoding section 205. In addition, channel estimation section 204 determines the channel quality (for example, the CSI) using the separated CSI-RS based on the instruction of control section 210. Channel estimation section 204 outputs the determined channel quality to control section 210.

Demodulation and decoding section 205 demodulates the DL control signal input from processing section 203. In addition, demodulation and decoding section 205 performs decoding processing (for example, blind detection processing) on the DL control signal after the demodulation. Demodulation and decoding section 205 outputs the scheduling information (for example, information indicating the transmission method including the DL/UL resource allocation and the MCS information) obtained by decoding the DL control signal to control section 210.

Demodulation and decoding section 205 performs demodulation and decoding processing on the DL data signal using the channel estimation value input from channel estimation section 204 based on the MCS information for the DL data signal input from control section 210.

Demodulation and decoding section 205 transfers the DL data signal after the demodulation to an application section (not illustrated). Note that the application section performs processing relating to a layer higher than the physical layer or the MAC layer.

Transmission signal generation section 206 generates a transmission signal (including the UL data signal and/or the UL control signal), and outputs the generated transmission signal to coding and modulation section 207.

Coding and modulation section 207 performs the coding processing and the modulation processing on the transmission signal input from transmission signal generation section 206 based on the MCS information input from control section 210, for example. Coding and modulation section 207 outputs the transmission signal after the modulation to mapping section 208.

Mapping section 208 maps the transmission signal input from coding and modulation section 207 to a predetermined radio resource (UL resource) based on the scheduling information (UL resource allocation) input from control section 210. In addition, mapping section 208 maps the DMRS to a predetermined radio resource (UL resource) based on the scheduling information.

Transmission section 209 performs transmission processing such as up-conversion and amplification on the UL signal (at least including the UL data signal and the DMRS) input from mapping section 208, and transmits the radio frequency signal (UL signal) from antenna 201.

Control section 210 controls the transmission processing of the UL signal and the reception processing of the DL signal in user terminal 20 based on the scheduling information (for example, information indicating the DL/UL resource allocation and the transmission method). For example, control section 210 performs control of the reception processing corresponding to the NC-JT for the DL signal.

In the radio communication system including radio base stations 10 and user terminal 20 described above, the NC-JT is applied, and the plurality of radio base stations 10 transmit the DL signal to one user terminal 20.

Note that the downlink channel and the uplink channel through which radio base stations 10 and user terminal 20 perform the transmission and reception processing are not limited to the PDCCH, the PDSCH, the PUCCH, the PUSCH, and the like described above. The downlink channel and the uplink channel through which radio base stations 10 and user terminal 20 perform the transmission and reception processing may be other channels such as a Physical Broadcast Channel (PBCH) and a Random Access Channel (RACH), for example.

In addition, in FIG. 2 and FIG. 3, DL and/or UL signal waveforms generated in radio base stations 10 and user terminal 20 may be signal waveforms based on Orthogonal Frequency Division Multiplexing (OFDM) modulation. Alternatively, the DL and/or UL signal waveforms may be signal waveforms based on Single Carrier-Frequency Division Multiple Access (SC-FDMA) or DFT-Spread-OFDM (DFT-S-OFDM)). Alternatively, the DL and/or UL signal waveforms may be other signal waveforms. In FIG. 2 and FIG. 3, the description of constituent sections (for example, an Inverse Fast Fourier Transform (IFFT) processing section, a Cyclic Prefix (CP) adding section, a CP removal section, and a Fast Fourier Transform (FFT) processing section, and the like) for generating the signal waveforms is omitted.

Next, the resource allocation method of the NC-JT in the radio communication system according to this embodiment is described.

In the radio communication system according to this embodiment, a resource allocation method of the NC-JT out of methods (a) to (f) below is applied, for example.
(a): a method of permitting partial overlap between resource 1 and resource 2
(b): a method of not permitting partial overlap between resource 1 and resource 2
(c): a method of permitting complete overlap between resource 1 and resource 2
(d): a method of not permitting complete overlap between resource 1 and resource 2
(e): a method of permitting a case where there is no overlap between resource 1 and resource 2
(f): a method of not permitting a case where there is no overlap between resource 1 and resource 2

First, method (a) and method (b) are described with reference to FIG. 4.

Figure 4:
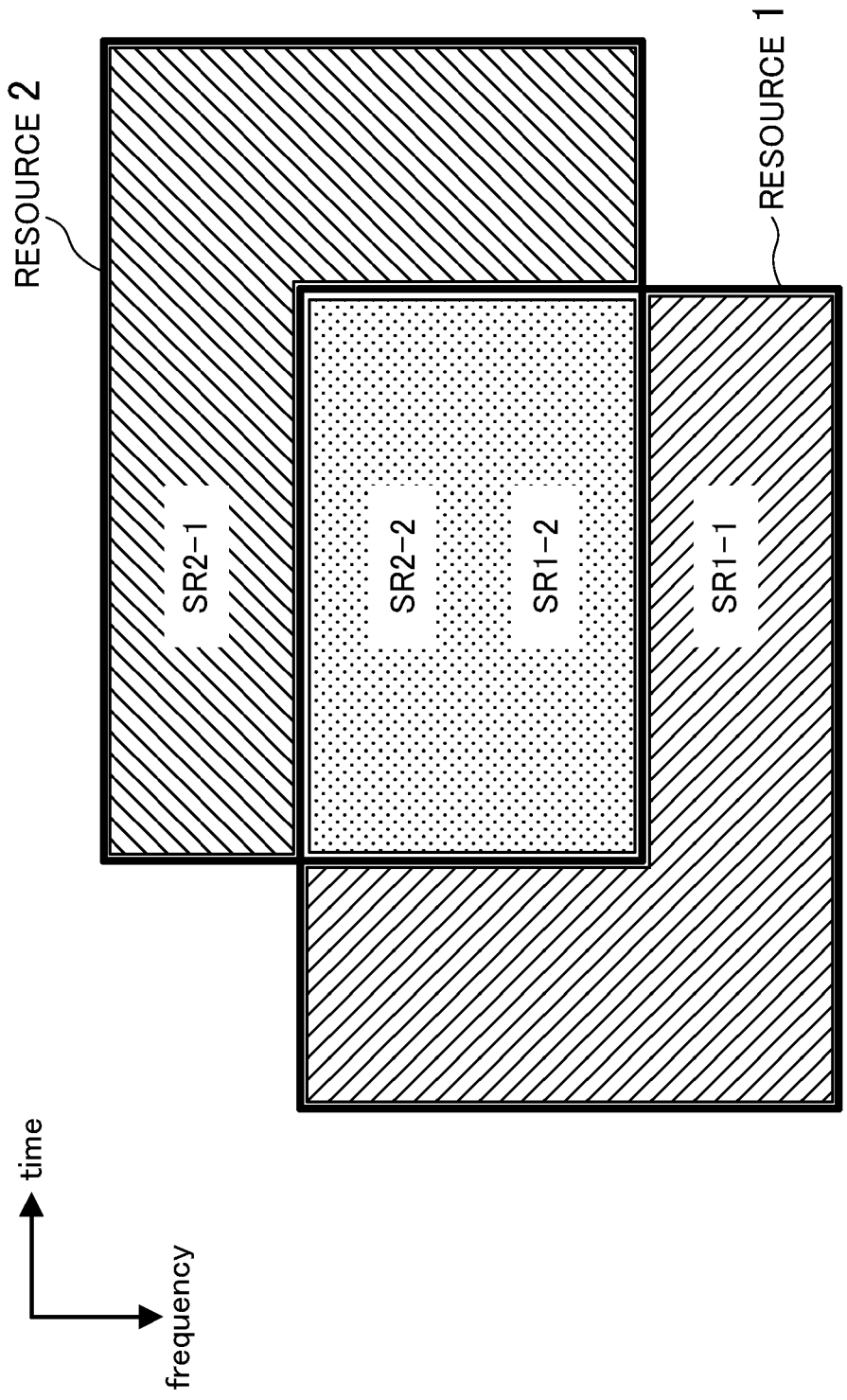
FIG. 4 illustrates a first example of resource allocation according to an embodiment of this disclosure.

FIG. 4 illustrates a first example of the resource allocation according to this embodiment. In FIG. 4, resource 1 and resource 2 specified in the time direction and the frequency direction are illustrated.

Resource 1 is a radio resource used when radio base station 10-1 (refer to FIG. 1) transmits a downlink signal to user terminal 20. Resource 2 is a radio resource used when radio base station 10-2 (refer to FIG. 1) transmits a downlink signal to user terminal 20. Note that, in the example in FIG. 4, resource 1 and resource 2 are resources that are the same size, that is, resources having the same width in the time direction and the frequency direction.

Resource 1 may be divided into partial resources by a boundary with the other resource 2 overlapping with resource 1. The partial resource may be referred to as a sub resource (SR) for descriptive purposes. The SR may or may not correspond to a SR of the second resource that is different from the first resource including the SR. In other words, one SR may correspond to the SR of one resource, or may correspond to the SRs of a plurality of different resources.

Note that the SR may be replaced with the naming of a partial resource, a partial domain, a partial resource domain, or the like.

For example, in FIG. 4, resource 1 may be divided into two SRs by the boundary with resource 2. The two SRs included in resource 1 are referred to as SR 1-1 and SR 1-2.

Resource 2 may be divided into two SRs by the boundary with resource 1 overlapping with resource 2. The two SRs included in resource 2 are referred to as SR 2-1 and SR 2-2. Note that, in FIG. 4, SR 1-2 and SR 2-2 corresponding to the part in which resource 1 and resource 2 are overlapping each other are resources that are the same size.

The SR indicates the partial resource in one resource that is specified by the positional relationship with another resource. For example, the positional relationship with another resource is the positional relationship of overlapping with another resource in the time direction and/or the frequency direction, or the positional relationship of not overlapping with another resource in the time direction and/or the frequency direction.

For example, in FIG. 4, SR 1-1 is a partial resource configured in a position that does not overlap with resource 2 in the time direction or a position that does not overlap with resource 2 in the frequency direction. SR 1-2 is a partial resource configured in a position overlapping with resource 2 in the time direction and a position overlapping with resource 2 in the frequency direction. SR 2-1 is a partial resource configured in a position that does not overlap with resource 1 in the time direction or a position that does not overlap with resource 1 in the frequency direction. SR 2-2 is a partial resource configured in a position overlapping with resource 1 in the time direction and a position overlapping with resource 1 in the frequency direction.

Out of the SRs configured in each resource, the SR overlapping with another resource may be referred to as an "overlapping SR". In addition, out of the SRs configured in each resource, the SR that does not overlap with another resource may be referred to as a "non-overlapping SR".

In other words, SR 1-1 indicates the partial resource that is not included in resource 2 out of resource 1, and SR 2-1 indicates the partial resource that is not included in resource 1 out of resource 2. SR 1-1 is an example of a resource that does not belong to resource 2 that is different from resource 1 to which SR 1-1 belongs, and SR 2-1 is an example of a resource that does not belong to resource 1 that is different from resource 2 to which SR 2-1 belongs. SR 1-2 and SR 2-1 indicate the partial resources included in both of resource 1 and resource 2. SR 1-2 (SR 2-1) is an example of a resource belonging to resource 1 and resource 2 that are two different resources.

Method (a) is a method in which the positional relationship between resource 1 and resource 2 as illustrated in FIG. 4 is permitted (supported). Method (b) is a method in which the positional relationship between resource 1 and resource 2 as illustrated in FIG. 4 is not permitted.

For example, when method (a) is applied, control section 210 of user terminal 20 performs the reception processing on the assumption that the partial overlap between resource 1 and resource 2 is permitted. In other words, control section 210 controls the reception processing on the assumption that at least two SRs are included in resource 1 and at least two SRs are included in resource 2.

For example, when method (b) is applied, control section 210 of user terminal 20 controls the reception processing on the assumption that the partial overlap between resource 1 and resource 2 is not permitted.

Next, method (c) and method (d) are described with reference to FIG. 5.

Figure 5:
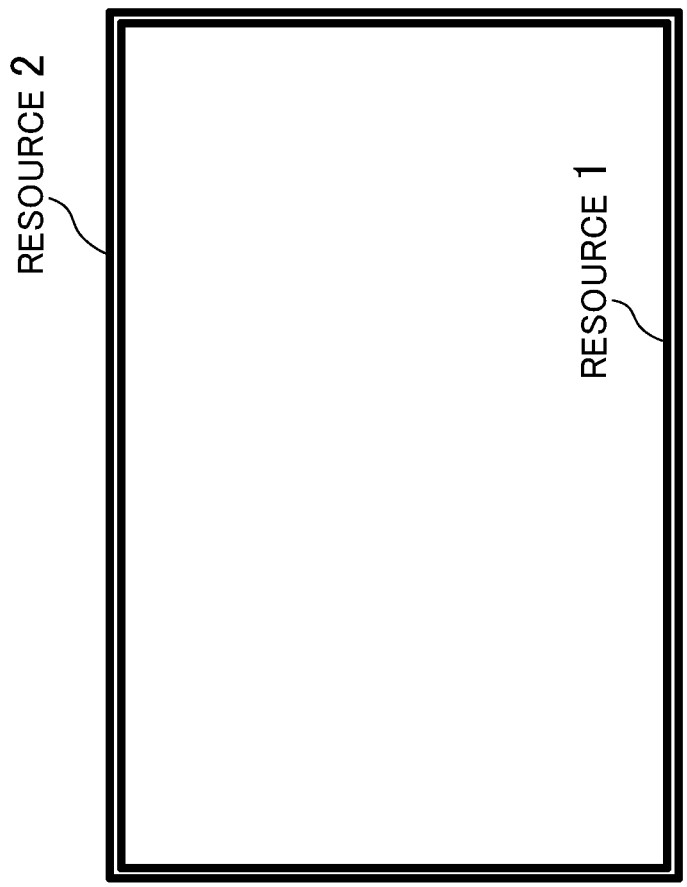
FIG. 5 illustrates a second example of resource allocation according to an embodiment of this disclosure.
Figure 5:
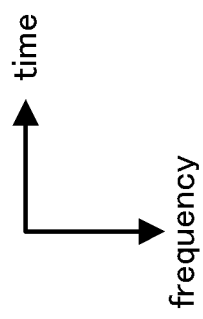

FIG. 5 illustrates a second example of the resource allocation according to this embodiment. In FIG. 5, resource 1 and resource 2 specified in the time direction and the frequency direction are illustrated.

Further, in the example in FIG. 5, resource 1 and resource 2 are resources that are the same size, that is, resources that have the same width in the time direction and the frequency direction and are completely overlapping each other. In other words, resource 1 and resource 2 completely match with each other.

In other words, resource 1 is the same resource as resource 2. In this case, SR does not necessarily need to be specified.

Method (c) is a method in which the positional relationship between resource 1 and resource 2 as illustrated in FIG. 5 is permitted. Method (d) is a method in which the positional relationship between resource 1 and resource 2 as illustrated in FIG. 5 is not permitted.

For example, when method (c) is applied, control section 210 of user terminal 20 controls the reception processing on the assumption that the complete overlap between resource 1 and resource 2 is permitted.

For example, when method (d) is applied, control section 210 of user terminal 20 controls the reception processing on the assumption that the complete overlap between resource 1 and resource 2 is not permitted.

Next, method (e) and method (f) are described with reference to FIG. 6.

Figure 6:
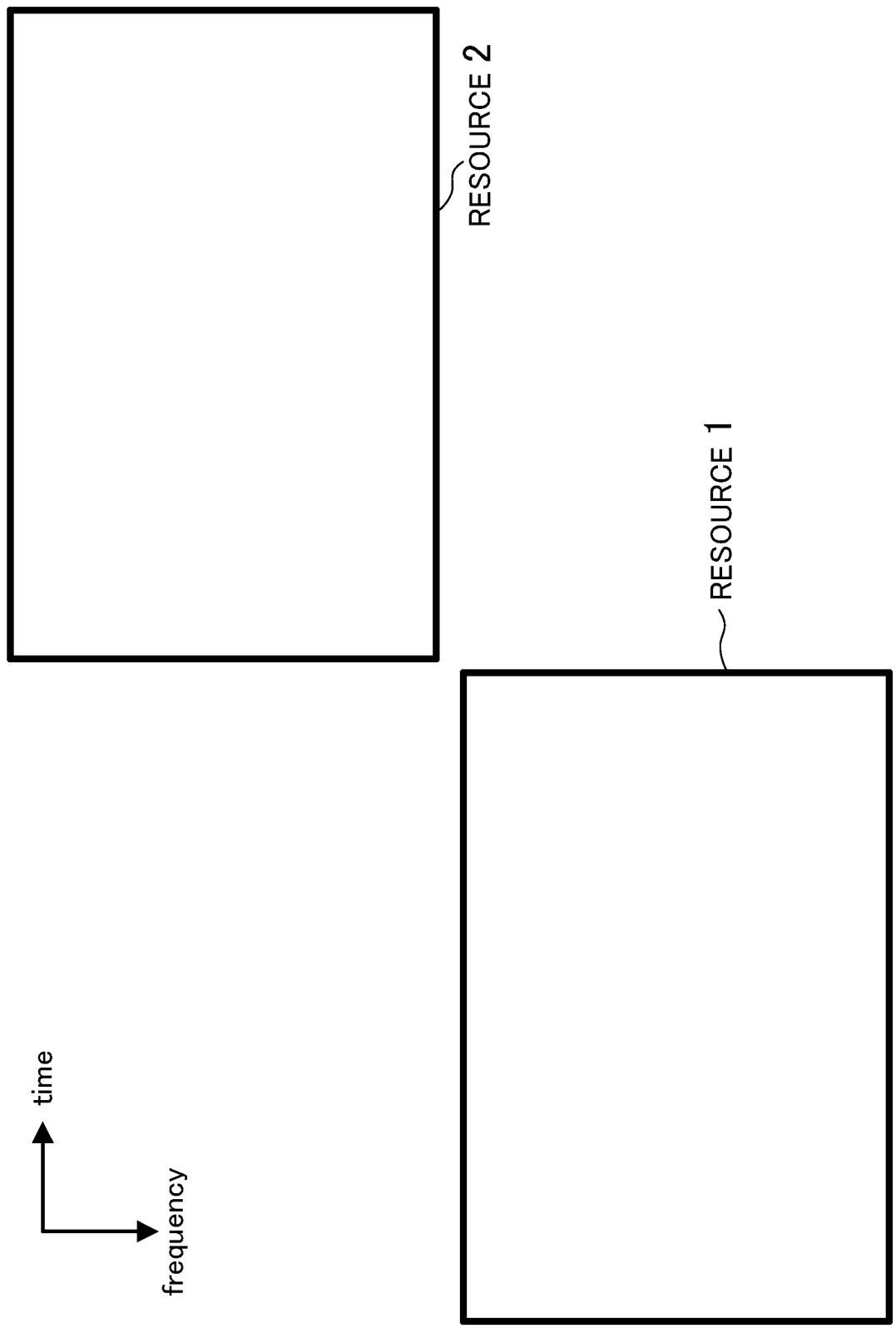
FIG. 6 illustrates a third example of resource allocation according to an embodiment of this disclosure.

FIG. 6 illustrates a third example of the resource allocation according to this embodiment. In FIG. 6, resource 1 and resource 2 specified in the time direction and the frequency direction are illustrated.

In the example in FIG. 6, resource 1 and resource 2 are resources that are the same size, that is, resources having the same width in the time direction and the frequency direction. Further, resource 1 is a resource that does not have a portion that overlaps with resource 2 in both of the time direction and the frequency direction.

In other words, resource 1 is a resource different from resource 2 in both of the time direction and the frequency direction. In this case, the SR does not necessarily need to be specified.

Method (e) is a method in which the positional relationship in which resource 1 and resource 2 do not overlap each other as illustrated in FIG. 6 is permitted. Method (f) is a method in which the positional relationship in which resource 1 and resource 2 do not overlap each other as illustrated in FIG. 6 is not permitted.

For example, when method (e) is applied, control section 210 of user terminal 20 controls the reception processing on the assumption that a case where there is no overlap between resource 1 and resource 2 is permitted.

For example, when method (f) is applied, control section 210 of user terminal 20 controls the reception processing on the assumption that a case where there is no overlap between resource 1 and resource 2 is not permitted.

A plurality of methods out of resource allocation methods (a) to (f) described above and methods (g) and (h) described below may be applied.

For example, method (b), method (c), and method (f) may be applied. In this case, the complete overlap between resource 1 and resource 2 is permitted, the partial overlap between resource 1 and resource 2 is not permitted, and a case where resource 1 and resource 2 do not overlap each other is not permitted. That is, only the complete overlap between resource 1 and resource 2 is permitted.

Resource allocation methods (a) to (f) described above may be individually applied to the time direction and the frequency direction.

For example, method (c) may be applied to the time direction, and method (a) may be applied to the frequency direction. In this case, the complete overlap between resource 1 and resource 2 in the time direction and the partial overlap between resource 1 and resource 2 in the frequency direction are permitted.

The applied resource allocation method may be specified in the specifications, or may be designated (notified) from NW 30 (refer to FIG. 1).

In addition, user terminal 20 may notify NW 30 of Capability information indicating the receivable resource allocation method via at least one of radio base station 10-1 and radio base station 10-2.

Note that the resource allocation methods described above are described using an example in which resource 1 and resource 2 are resources that are the same, but resource 1 and resource 2 may be resources that are different in size.

In addition, when resource 1 and resource 2 are different in size, a resource allocation method to which method (g) and method (h) below in addition to methods (a) to (f) described above are applicable may be added.

(g): a method of permitting a case where one of resource 1 and resource 2 is included in the other
(h): a method of not permitting a case where one of resource 1 and resource 2 is included in the other Next, method (g) and method (h) are described with reference to FIG. 7.

Figure 7:
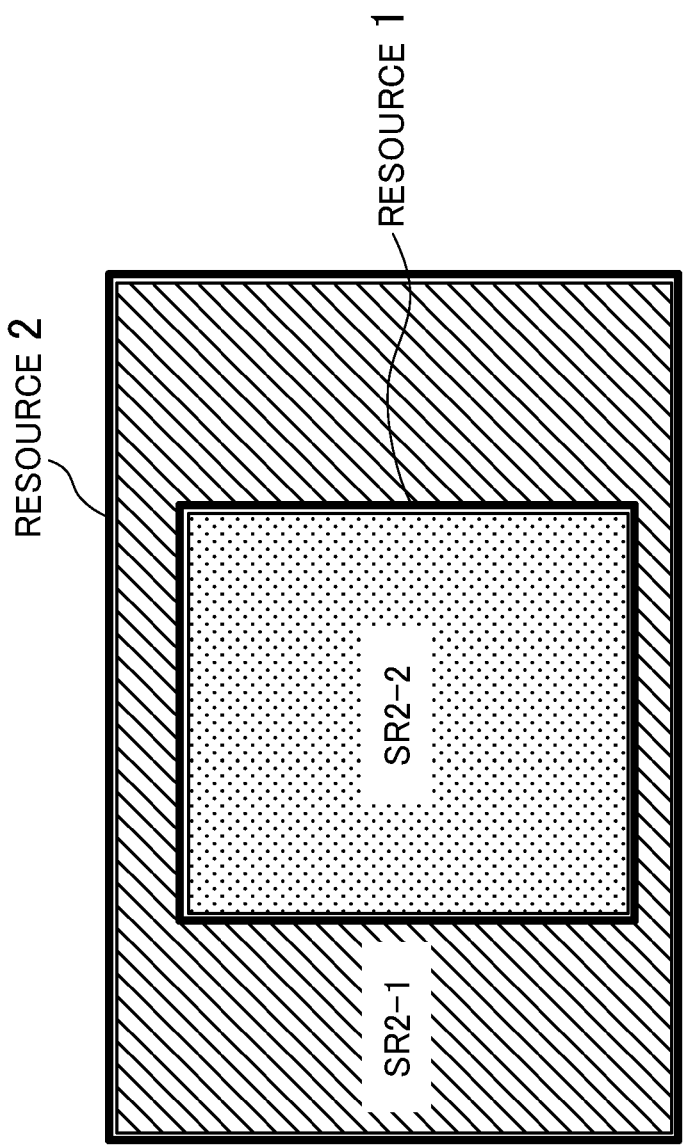
FIG. 7 illustrates a fourth example of resource allocation according to an embodiment of this disclosure.
Figure 7:
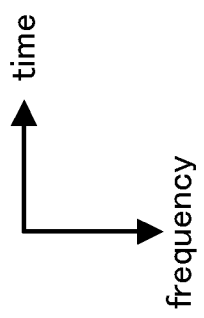

FIG. 7 illustrates a fourth example of the resource allocation according to this embodiment. In FIG. 7, resource 1 and resource 2 specified in the time direction and the frequency direction are illustrated.

In the example in FIG. 7, resource 1 is smaller than resource 2 in both of the time direction and the frequency direction. Further, resource 1 is included in resource 2.

When resource 1 is included in resource 2, an SR may be specified in resource 2. In the example in FIG. 7, SR 2-1 is a partial resource configured in a position that does not overlap with resource 1 in the time direction or a position that does not overlap with resource 1 in the frequency direction. Further, SR 2-2 is a partial resource configured in a position overlapping with resource 1 in the time direction and a position overlapping with resource 1 in the frequency direction.

Method (g) is a method in which the positional relationship between resource 1 and resource 2 as illustrated in FIG. 7 is permitted. Method (h) is a method in which the positional relationship between resource 1 and resource 2 as illustrated in FIG. 7 is not permitted.

For example, when method (g) is applied, control section 210 of user terminal 20 controls the reception processing on the assumption that a case where one of resource 1 and resource 2 is included in the other is permitted.

For example, when method (h) is applied, control section 210 of user terminal 20 controls the reception processing on the assumption that a case where one of resource 1 and resource 2 is included in the other is not permitted.

For example, when resource 2 is a reference, resource 2 partially overlaps with resource 1. Therefore, method (g) may be understood as one variation of method (a). In addition, when resource 1 is a reference, resource 1 completely overlaps with resource 2. Therefore, method (g) may be understood as one variation of method (c).

Note that resource allocation methods (a) to (h) described above are examples, and this disclosure is not limited thereto. For example, one method corresponding to two or more methods out of resource allocation methods (a) to (h) described above may be specified. The one method may be a method associated to or merged with two or more methods out of resource allocation methods (a) to (h) described above.

For example, method (i) below corresponding to the plurality of methods may be specified.
 (i): a method of permitting resource 1 and resource 2 to be configured to at least one of different times and different frequency bands.

Now, when resource 1 and resource 2 are configured to different times, it means that at least one of a starting position and an ending position in the time direction that specifies each of resource 1 and resource 2 differs between resource 1 and resource 2. The starting position in the time direction is a transmission starting timing, for example, and the ending position in the time direction is a transmission ending timing, for example.

In addition, when resource 1 and resource 2 are configured to different frequency bands, it means that at least one of the frequencies of the two boundaries in the frequency direction that specifies each of resource 1 and resource 2 differs between resource 1 and resource 2.

Method (i) includes method (a) of permitting the partial overlap between resource 1 and resource 2, method (e) of permitting a case where there is no overlap between resource 1 and resource 2, and method (g) of permitting a case where one of resource 1 and resource 2 is included in the other, for example.

For example, when method (i) is applied, control section 210 of user terminal 20 controls the reception processing on the assumption that a case where resource 1 and resource 2 are configured to at least one of different times and different frequency bands is permitted.

By applying the resource allocation methods as described above, the flexibility of the resource allocation used when the plurality of radio base stations 10 transmit signals to user terminal 20 by the NC-JT, for example, can be enhanced.

Note that an example in which radio base stations 10 are notified of the information indicating the resource allocation method from NW 30 has been described, but the notification of the resource overlapping information may be provided from NW 30 or may be provided from radio base stations 10. The resource overlapping information is information relating to whether overlapping portions are included in the allocated resources, for example.

For example, the resource overlapping information indicates whether there is overlap in the frequency direction and the time direction.

In addition, the notification of the resource overlapping information in the frequency direction and the notification of the resource overlapping information in the time direction may be individually provided.

For example, in the resource overlapping information in the frequency direction, the notification of whether there is overlap in the frequency direction and/or the sizes of the resources (SRs) overlapping in the frequency direction may be provided from NW 30 or radio base stations 10. The notification of whether there is overlap in the frequency direction may be provided in units of Physical Resource Blocks (PRBs). In addition, the sizes of the resources overlapping in the frequency direction may be indicated by the number of the PRBs, for example.

For example, in the resource overlapping information in the time direction, the notification of whether there is overlap in the time direction and/or the sizes of the resources overlapping in the time direction may be provided from NW 30 or radio base stations 10. The notification of whether there is overlap in the time direction may be provided in units of symbols. In addition, the sizes of the resources overlapping in the time direction may be indicated by the number of the symbols, for example.

Note that, the notification of the resource overlapping information described above does not necessarily need to be explicitly provided. For example, it may be implicitly indicated there is overlap between the resources by providing a notification of information indicating that two or more SRs are included in one resource.

In addition, user terminal 20 may be notified of the number of the SRs included in one resource. For example, user terminal 20 may be notified of the number of the SRs in the DCI. Alternatively, a DCI format including a plurality of pieces of Resource Assginment (RA) information may be specified.

In addition, the number of the SRs that is supportable by user terminal 20 may be included the Capability information of which notification is provided by user terminal 20.

Note that, in the resource allocation described above, a case where the overlapping SR and the non-overlapping SR are included in each resource has been described. The transmission quality may be different for the signal transmitted for the overlapping SR and the signal transmitted for the non-overlapping SR. Next, an example in which the transmission method is configured in accordance with whether there is overlap between the SRs is described.

For example, a Codeword (CW) in accordance with whether there is overlap between the SRs may be applied. In this case, a different CW may be applied for each SR.

For example, the order of Codebook (CB) mapping may be changed in accordance with whether there is overlap between the SRs.

The CB mapping may be performed on a subcarrier, performed on an OFDM symbol thereafter, and then performed on the SR. Alternatively, the CB mapping may be performed on the OFDM symbol, performed on the subcarrier thereafter, and then performed on the SR.

In addition, at least one of the transmission rank, the precoder, and the MCS may be configured in accordance with whether there is overlap between the SRs.

For example, when the transmission rank is configured in accordance with whether there is overlap between the SRs, the value of the transmission rank may be configured for each SR, or the offset with respect to the value of the transmission rank that is a reference may be configured for each SR. In this case, user terminal 20 may be notified of the value of the transmission rank or the offset that is configured.

In addition, for example, the transmission power may be configured in accordance with whether there is overlap between the SRs.

For example, in the overlapping SR, the boosting of the transmission power (power boosting) may be applied.

When the boosting of the transmission power is applied, the offset of the transmission power may be configured in accordance with whether there is overlap between the SRs. Alternatively, the offset of the transmission power may be configured in accordance with the number of multiplexed layers and/or the number of overlaps in the SRs.

Note that, the boosting of the transmission power may be applied in units of symbols. By applying the boosting of the transmission power in units of symbols, the transmission power is controlled for each symbol, and hence the transmission power per unit time can be caused to be constant.

In addition, when the boosting of the transmission power is applied in units of symbols, the boosting of the transmission power may be applied in accordance with whether there is overlap in the frequency direction of the SR.

In addition, as described above, for example, when the transmission method is configured for each SR, the notification of the information configured for each SR is provided, and hence Resource Allocation (RA) information increases and the overhead of the DCI may become stringent.

In order to suppress the increase in the RA information, the granularity of the RA information may be changed in accordance with the number of the SRs.

For example, the Resource Block Group (RBG) size may be changed in accordance with the number of the SRs. For example, when one RBG in the RA information of one resource in which the SR is not configured corresponds to four RBs, one RBG in the RA information of one resource in which four SRs are configured may be changed to eight RBs or 16 RBs. As a result, the increase of the RA information can be suppressed and the overhead of the DCI can be suppressed.

As described above, by configuring the transmission method in accordance with whether there is overlap between the SRs, the flexibility of the resource allocation can be enhanced and the transmission quality can be enhanced.

Note that the transmission quality may be different for the signal transmitted for the overlapping SR and the signal transmitted for the non-overlapping SR. In this case, a CSI feedback in user terminal 20 may be executed based on whether there is overlap.

For example, NW 30 or radio base stations 10 may be notified of information indicating which resource allocation out of the resource allocation in which there is overlap between the resources and the resource allocation in which there is no overlap between the resources is better.

For example, when the NC-JT with two radio base stations 10 is applicable, the communication partner of user terminal 20 may be selected from three patterns, that is, radio base station 10-1, radio base station 10-2, and both of radio base station 10-1 and radio base station 10-2. User terminal 20 may be notified of the information (hereinafter TRP selected information) indicating the communication partner selected from the three patterns. User terminal 20 that has received the notification feed backs the CSI in accordance with the communication partner.

For example, a resource (may be hereinafter referred to as a CSI-RS resource) that maps CSI-RS is configured for each of resource 1 and resource 2 allocated to user terminal 20. User terminal 20 calculates the CSI from CSI-RS #1 mapped to the CSI-RS resource of resource 1 and CSI-RS #2 mapped to the CSI-RS resource of resource 2.

For example, when the communication partner of user terminal 20 is radio base station 10-1, CSI-RS #1 is configured for the CSI-RS of a Channel measurement resource, and CSI-RS #2 is configured for the CSI-RS of an Interference measurement resource. Control section 210, for example, of user terminal 20 controls the transmission processing so that the CSI is determined from each CSI-RS and the determined CSI is fed back to radio base station 10-1.

Alternatively, user terminal 20 may determine the CSI (the CSI in three patterns) corresponding to each of the communication partners in three patterns described above, and may feedback the determined CSI to at least one of radio base station 10-1 and radio base station 10-2.

<Variation of Sub Resource>

Note that, in the example described above, the SR is specified in accordance with whether resource 1 and resource 2 overlap each other. Next, a variation regarding the specification of the SR is described.

Figure 8:
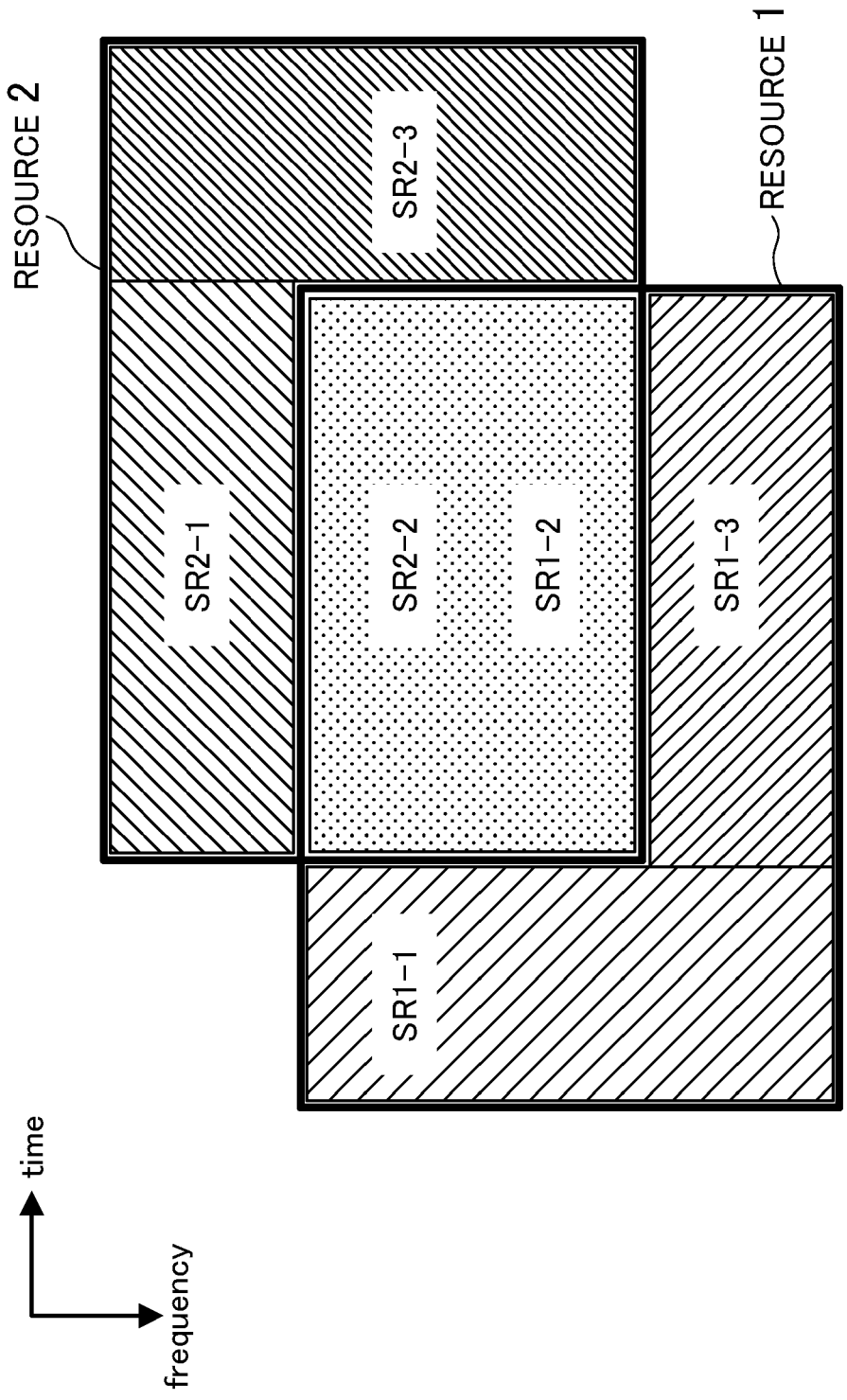
FIG. 8 illustrates a fifth example of resource allocation according to an embodiment of this disclosure.

FIG. 8 illustrates a fifth example of the resource allocation according to this embodiment. FIG. 8 illustrates resource 1 and resource 2 having a positional relationship similar to that in FIG. 4. Further, in FIG. 8, the specified SRs are different from those in FIG. 4.

FIG. 8 is an example in which the SRs are specified in accordance with whether there is overlap in each of the time direction and the frequency direction.

In FIG. 8, SR 1-1, SR 1-2, and SR 1-3 are SRs of resource 1. Further, SR 1-1 is a SR of resource 1 that does not overlap with resource 2 in the time direction. SR 1-2 is a SR of resource 1 overlapping with resource 2 in both of the time direction and the frequency direction. SR 1-3 is a SR of resource 1 that overlaps with resource 2 in the time direction and does not overlap with resource 2 in the frequency direction. SR 1-2 and SR 1-3 overlap with resource 2 in the time direction.

In addition, in FIG. 8, SR 2-1, SR 2-2, and SR 2-3 are SRs of resource 2. Further, SR 2-1 is a SR of resource 2 that overlaps with resource 1 in the time direction and does not overlap with resource 1 in the frequency direction. SR 2-2 is a SR of resource 2 overlapping with resource 1 in both of the time direction and the frequency direction. SR 2-3 is a SR of resource 2 that does not overlap with resource 1 in the time direction. SR 2-1 and SR 2-2 overlap with resource 1 in the time direction.

For example, the transmission method may be individually configured for the SRs included in the same time and the SRs included in different times.

For example, the configured transmission method may be a method of applying the CW or a CW mapping method. Alternatively, the configured transmission method may be at least one of the transmission rank, the precoder, and the MCS. Alternatively, the configured transmission method may be the transmission power.

In the example in FIG. 8, at least one of the transmission methods described above may be individually configured for SR 1-1 and SR 2-3 that do not overlap each other in the time direction, and SR 1-3, SR 1-2, SR 2-2, and SR 2-1 overlapping each other in the time direction.

Figure 9:
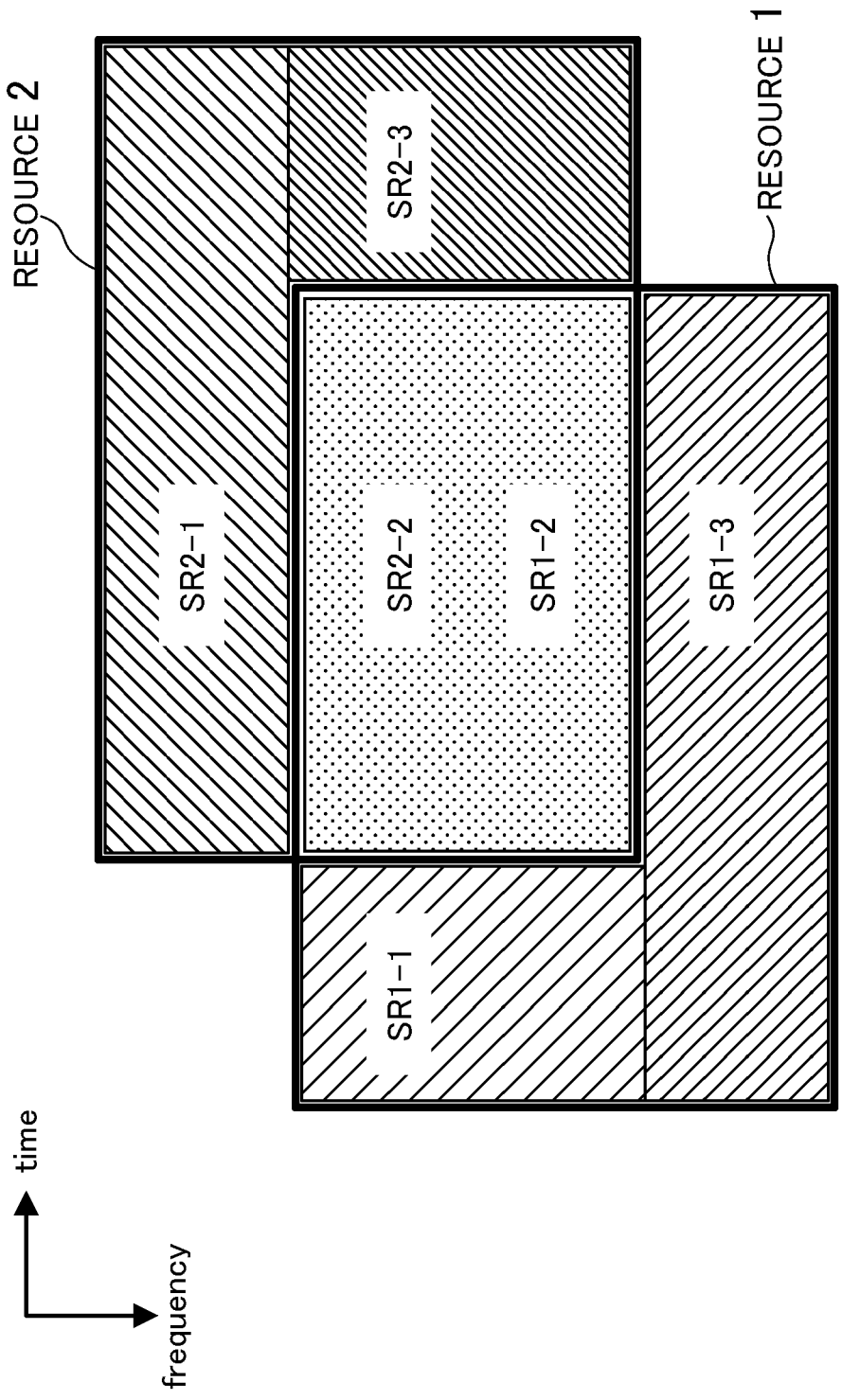
FIG. 9 illustrates a sixth example of resource allocation according to an embodiment of this disclosure.

FIG. 9 illustrates a sixth example of the resource allocation according to this embodiment. FIG. 9 illustrates resource 1 and resource 2 having a positional relationship similar to those in FIG. 4 and FIG. 8. Further, in FIG. 9, the specified SRs are different from those in FIG. 4 and FIG. 8.

FIG. 9 is an example in which the SRs are specified in accordance with whether there is overlap in each of the time direction and the frequency direction.

In FIG. 9, SR 1-1, SR 1-2, and SR 1-3 are SRs of resource 1. Further, SR 1-1 is a SR of resource 1 that overlaps with resource 2 in the frequency direction and does not overlaps with resource 2 in the time direction. SR 1-2 is a SR of resource 1 overlapping with resource 2 in both of the time direction and the frequency direction. SR 1-3 is a SR of resource 1 that does not overlap with resource 2 in the frequency direction. SR 1-1 and SR 1-2 overlap with resource 2 in the frequency direction.

In addition, in FIG. 9, SR 2-1, SR 2-2, and SR 2-3 are SRs of resource 2. Further, SR 2-1 is a SR of resource 2 that does not overlap with resource 1 in the frequency direction. SR 2-2 is a SR of resource 2 overlapping with resource 1 in both of the time direction and the frequency direction. SR 2-3 is a SR of resource 2 that overlaps with resource 1 in the frequency direction and does not overlap with resource 1 in the time direction. SR 2-2 and SR 2-3 overlap with resource 1 in the frequency direction.

For example, a transmission method is individually configured for the SRs included in the same frequency band and the SRs included in different frequency bands.

For example, the configured transmission method may be a method of applying the CW or a CW mapping method. Alternatively, the configured transmission method may be at least one of the transmission rank, the precoder, and the MCS. Alternatively, the configured transmission method may be the transmission power.

In the example in FIG. 9, at least one of the transmission methods described above may be individually configured for SR 1-3 and SR 2-1 that do not overlap each other in the frequency direction and SR 1-1, SR 1-2, SR 2-2, and SR 2-2 overlapping each other in the frequency direction.

In addition, the transmission method may be individually configured for each SR in accordance with whether the SRs are included in the same frequency band and/or whether the SRs are included in the same time.

As described above, when the resources (for example, resource 1 and resource 2) of the signals transmitted from the plurality of radio base stations 10 overlap each other in the time direction and/or the frequency direction, there is a possibility of the CSI-RS resources overlapping each other in the time direction and/or the frequency direction.

In this case, user terminal 20 assumes that there is a possibility of the CSI-RS resources overlapping each other (that is, being the same) in the time direction and/or the frequency direction.

Further, user terminal 20 determines the CSI using the CSI-RSs of the CSI-RS resources overlapping each other in the time direction and/or the frequency direction (that is, the same). In addition, user terminal 20 determines another CSI using the CSI-RSs of the CSI-RS resources that do not overlap each other in the time direction and the frequency direction (that is, not the same).

In the example in FIG. 8, user terminal 20 may calculate the CSI for SR 1-1, the CSI for SR 1-2, SR 1-3, SR 2-2, and SR 2-1, and the CSI for SR 2-3.

In addition, in the example in FIG. 9, user terminal 20 may calculate the CSI for SR 2-1, the CSI for SR 1-1, SR 1-2, SR 2-2, and SR 2-3, and the CSI for SR 1-3.

User terminal 20 notifies NW 30 or radio base stations 10 of the calculated CSI using a resource for CSI report. Note that the resource for CSI report is configured by NW 30 or radio base stations 10.

For example, when the resources for the CSI report are insufficient with respect to the number of the calculated CSIs, user terminal 20 may select the CSI (CSI to be dropped) to be not reported in accordance with priority from the calculated CSI.

For example, the CSI for the CSI-RS resources overlapping each other in the time direction and/or the frequency direction may have a higher priority than the CSI for the CSI-RS resources that do not overlap each other in the time direction and the frequency direction. Alternatively, the CSI for the CSI-RS resources overlapping each other in the time direction and/or the frequency direction may have a lower priority than the CSI for the CSI-RS resources that do not overlap each other in the time direction and the frequency direction.

For example, the CSI for the CSI-RS resource of radio base station 10 in which the number of MIMO layers to be transmitted and received is the smallest may have a higher priority than the CSI for the CSI-RS resource of radio base station 10 in which the number of MIMO layers to be transmitted and received is larger. Alternatively, the CSI for the CSI-RS resource of radio base station 10 in which the number of MIMO layers to be transmitted and received is the smallest may have a lower priority than the CSI for the CSI-RS resource of radio base station 10 in which the number of MIMO layers to be transmitted and received is larger.

For example, the CSI for the CSI-RS resource of radio base station 10 in which the number (for example, an index) of the MIMO layer is the smallest may have a higher priority than the CSI for the CSI-RS resource of radio base station 10 in which the number of the MIMO layer is larger. Alternatively, the CSI for the CSI-RS resource of radio base station 10 in which the number of the MIMO layer is the smallest may have a lower priority than the CSI for the CSI-RS resource of radio base station 10 in which the number of the MIMO layer is larger.

As described above, even when the number of the CSIs increases, the insufficiency of the resources for CSI report can be responded to by selecting the CSI to be reported in accordance with the priority.

In addition, for example, user terminal 20 may assume that the CSI for the CSI-RS resources overlapping each other in the time direction and/or the frequency direction (hereinafter referred to as "predetermined CSI") is reported to NW 30 or radio base stations 10 using any one or more of the resources for CSI report corresponding to the CSI-RSs of the plurality of radio base stations 10.

For example, the predetermined CSI may be reported using the resource for CSI report corresponding to the CSI-RS resource of radio base station 10 in which the number of MIMO layers to be transmitted and received is small.

In addition, for example, the predetermined CSI may be reported using the resource for CSI report corresponding to the CSI-RS of which index (TRP index) applied to radio base station 10 and/or CSI-RS resource index are the lowest values.

In addition, for example, the predetermined CSI may be reported using the resource for CSI report corresponding to the CSI-RS of which index of time and/or index of frequency are the lowest values.

User terminal 20 according to this embodiment described above includes a reception section configured to receive a downlink signal (first radio signal) transmitted by radio base station 10-1 (first transmission point) and a downlink signal (second radio signal) transmitted by radio base station 10-2 (second transmission point), and a control section configured to control reception processing of the downlink signals (the first radio signal and the second radio signal) on the assumption that resource 1 (a first radio resource of the first radio signal) and resource 2 (a second radio resource of the second radio signal) are permitted to be configured to at least one of different times and different frequency bands.

This configuration makes it possible for the flexibility of the resource allocation to be enhanced in the future radio communication system to which the NC-JT is applied because the difference in at least one of the time and the frequency band is permitted in the resource allocation of the NC-JT.

The enhancement in the transmission characteristics and/or the enhancement in the degree of freedom in the scheduling can be achieved because the flexibility of the resource allocation can be enhanced.

For example, when the frequency fading characteristics between radio base station 10-1 and user terminal 20 and the frequency fading characteristics between radio base station 10-2 and user terminal 20 are different from each other, the transmission characteristics can be enhanced by allocating different frequency bands for each radio base station 10.

In addition, for example, in the future radio communication system, by allocating a different time even when the time specifying the resource is changed as in the configuration referred to as a slot configuration or a non-slot configuration, the degree of freedom in the time direction can be enhanced, and the enhancement in the transmission characteristics and/or the enhancement in the degree of freedom in the scheduling can be achieved.

Note that the embodiment described above is mainly described based on the channel and the signaling scheme in the future radio communication system (for example, a New Radio (NR)), but this disclosure may be applied to a channel and a signaling scheme having a similar function as the NR.

In addition, various signaling examples have been shown in the embodiment described above, but the notification of the signaling is not limited to be provided using an explicit method and may be provided using an implicit method.

In addition, various signaling examples are shown in the embodiment described above, but this disclosure is not limited to the signaling examples described above. Signaling of different layers such as Radio Resource Control (RRC), Medium Access Control Control Element (MAC CE), and DCI, for example, may be used for the signaling. Alternatively, the signaling may use a Master Information Block (MIB) and a System Information Block (SIB).

For example, the RRC and the DCI may be used in combination, the RRC and the MAC CE may be used in combination, and the RRC, the DCI, and the MAC CE may be used in combination.

In addition, the "RB" and the "subcarrier" described in the embodiment described above may be replaced with each other. Similarly, the "slot" and the "symbol" described in the embodiment described above may be replaced with each other.

In addition, the NC-JT (for example, two-cell NC-JT) between two radio base stations 10 and one user terminal 20 has been mainly described in the embodiment described above, but this disclosure is not limited thereto. For example, one user terminal 20 may perform the NC-JT with three or more radio base stations 10.

In this case, the resource allocation method of the NC-JT may be applied to three or more radio base stations 10 altogether. Alternatively, independent methods may be applied to two or more sets of radio base stations 10. For example, when radio base stations 10-1 to 10-3 perform the NC-JT, independent methods may be applied to a set of radio base station 10-1 and 10-2, a set of radio base stations 10-2 and 10-3, and a set of radio base stations 10-1 and 10-3.

In addition, when one user terminal 20 performs the NC-JT with three or more radio base stations 10, the number of the resources of which overlap is permitted and/or the number of the SRs permitted to be included in one resource may be configured in each method.

In addition, in the embodiment described above, an example in which user terminal 20 receives the downlink signals from radio base stations 10 has been described. This disclosure is not limited thereto. This disclosure may be applied regardless of the distinction between the uplink transmission and reception and the downlink transmission and reception. For example, this disclosure is applied even when user terminal 20 transmits uplink signals to radio base stations 10.

When this disclosure is applied to the transmission of the uplink signal, the "uplink signal", the "up signal", and the "uplink channel" described in the embodiment described above may be replaced with the "downlink signal", the "down signal", and the "downlink channel".

The embodiment and variations (modification) described above may be combined, and the features described in those examples may be combined in various combinations. This disclosure is not limited to the predetermined combinations disclosed in the present specification.

The embodiment of this disclosure has been described above.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 10:
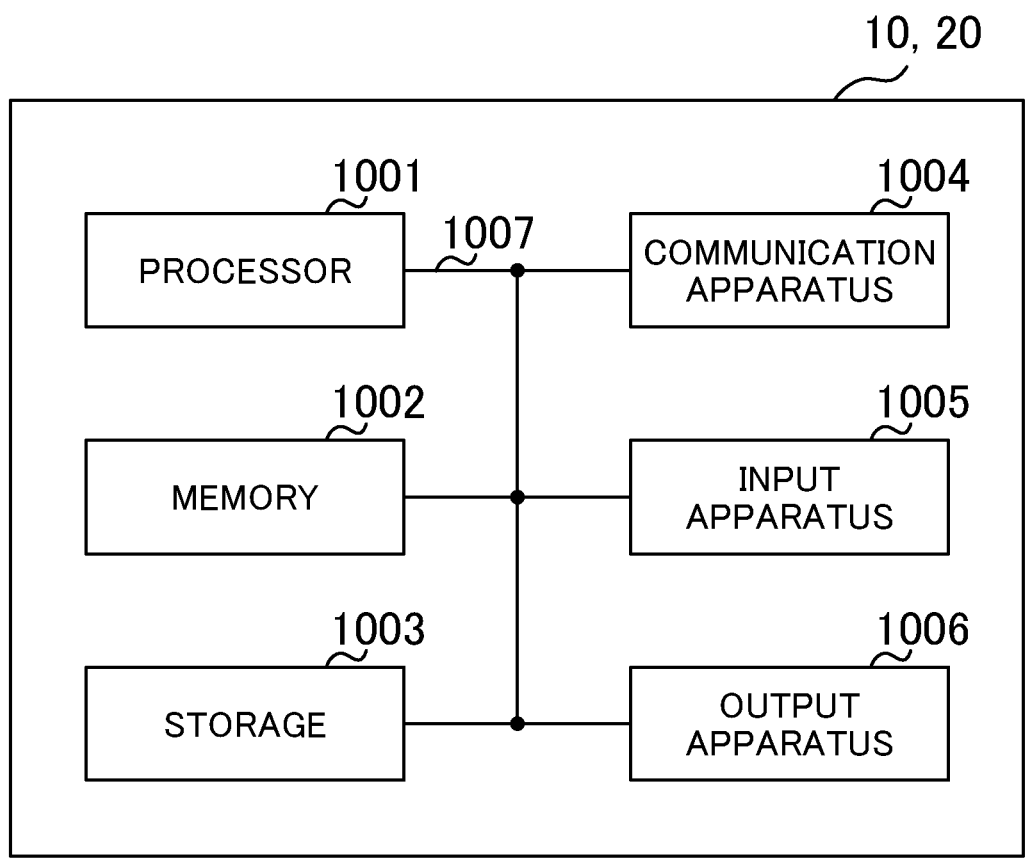
FIG. 10 illustrates an example of a hardware configuration of the radio base station and the user terminal according to an embodiment of this disclosure.

For example, radio base station 10, user terminal 20, and the like according to an embodiment of the present disclosure may function as a computer that executes processing of a radio communication method of the present disclosure. FIG. 10 illustrates an example of a hardware configuration of radio base station 10 and user terminal 20 according to an embodiment of the present disclosure. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, scheduler 101, transmission signal generation sections 102 and 206, coding and modulation sections 103 and 207, mapping sections 104 and 208, processing sections 108 and 203, channel estimation sections 109 and 204, demodulation and decoding sections 110 and 205, control section 210, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 105 and 209, antennas 106 and 201, reception sections 107 and 202, interface section 111, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" can be interchangeably used in the present specification. The base station may be called a fixed station, a NodeB, an eNodeB (eNB), a gNodeB (gNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (for example, looking up in a table, a database or another data structure), ascertaining and the like. Also, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. In addition, the DMRS may be called by other corresponding names such as a RS for demodulation or a DM-RS, for example.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini-slot, and the symbol indicate time units in transmitting signals. The radio frame, the subframe, the slot, the mini-slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, one slot, or one mini-slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini-slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini-slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present disclosure is useful for a mobile communication system.

REFERENCE SIGNS LIST 10, 10-1, 10-2 Radio Base Station
20 User Terminal
30 Network (NW)
101 Scheduler
102, 206 Transmission Signal Generation Section
103, 207 Coding and Modulation Section
104, 208 Mapping Section
105, 209 Transmission Section
106, 201 Antenna
107, 202 Reception Section
108, 203 Processing Section
109, 204 Channel Estimation Section
110, 205 Demodulation and Decoding Section
210 Control Section
111 Interface Section

The invention claimed is:

1. A terminal, comprising:
a control section that controls reception of a physical downlink shared channel (PDSCH); and
a transmission section that transmits capability information indicating whether or not overlap of a resource between a plurality of PDSCHs in time is supported.

2. The terminal according to claim 1, wherein
the overlap is at least one of full overlap and partial overlap of the resource between the plurality of the PDSCHs.

3. The terminal according to claim 1, wherein
the transmission section transmits information indicating quality of reception at the resource.

4. The terminal according to claim 1, wherein
the resource between the plurality of PDSCHs in frequency is not overlapped.

5. A radio communication method, comprising:
controlling reception of a physical downlink shared channel (PDSCH);
transmitting capability information indicating whether or not overlap of a resource between a plurality of PDSCHs in time is supported.

* * * * *